(12) United States Patent
Trivelpiece et al.

(10) Patent No.: US 11,763,249 B2
(45) Date of Patent: Sep. 19, 2023

(54) ROBOTIC GENERATION OF A MARKER DATA MAPPING FOR USE IN INVENTORYING PROCESSES

(71) Applicant: Sensormatic Electronics, LLC, Boca Raton, FL (US)

(72) Inventors: Steve E. Trivelpiece, Rancho Santa Margarita, CA (US); Craig E. Trivelpiece, Mission Viejo, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 55 days.

(21) Appl. No.: 15/359,945

(22) Filed: Nov. 23, 2016

(65) Prior Publication Data

US 2018/0107969 A1     Apr. 19, 2018

Related U.S. Application Data

(60) Provisional application No. 62/408,578, filed on Oct. 14, 2016.

(51) Int. Cl.
*G06Q 10/087*   (2023.01)
*G06Q 10/08*    (2023.01)
*G06K 7/10*     (2006.01)

(52) U.S. Cl.
CPC .......... *G06Q 10/087* (2013.01); *G06Q 10/08* (2013.01); *G06K 7/10217* (2013.01)

(58) Field of Classification Search
CPC .... H04B 17/318; H04B 17/27; H04B 10/116; H04B 10/502; H04B 17/373; H04B 1/3833; H04B 1/385; H04B 2001/3861; H04B 7/18504; H04B 7/18506; H04B 7/24; G01S 5/02; G01S 5/0252; G01S 5/0294; G01S 5/0226; G01S 1/68; G01S 5/0027;

(Continued)

(56) References Cited

U.S. PATENT DOCUMENTS 7,468,650 B2 * 12/2008 Childress ............... G06K 17/00
                                                        340/5.92
7,693,757 B2 *  4/2010 Zimmerman ........ G05D 1/0274
                                                         705/28

(Continued)

FOREIGN PATENT DOCUMENTS

WO    2015026862 A1    2/2015

OTHER PUBLICATIONS

Communication Pursuant to Article 94(3) EPC for European Patent Application No. 17 798 027.3, dated Sep. 10, 2020 (4 pages).

*Primary Examiner* — Florian M Zeender
*Assistant Examiner* — Vanessa Deligi
(74) *Attorney, Agent, or Firm* — ARENTFOX SCHIFF LLP

(57) ABSTRACT

Systems and methods for creating a data mapping to be used in a subsequent inventorying process to locate objects within an area. The methods comprise: identifying, by a robot, at least one first marker disposed within the area which should be re-programed; autonomously transforming, by the robot, a first programmed state of the at least one first marker to a second programmed state; and autonomously creating, by the robot, the data mapping specifying a current physical location of the at least one first marker which was re-programed and current physical locations of second markers also disposed within the area.

19 Claims, 6 Drawing Sheets

(58) Field of Classification Search
CPC ... G01S 5/14; G01S 19/42; G01S 1/02; G01S 1/08; G01S 5/12; G01S 17/42; G01S 19/10; G01S 19/16; G01S 19/17; G01S 19/34; G01S 19/40; G01S 19/48; G01S 1/024; G01S 1/04; G01S 1/06; G01S 1/70; G01S 1/72; G01S 1/76; G01S 5/0045; G01S 5/0205; G01S 5/0236; G01S 5/0242; G01S 5/0273; G01S 5/0278; G01S 5/0289; G01S 5/16; G06F 1/3212; G06F 21/50; G06F 3/013; G06F 3/0346; G06F 3/04817; G06F 3/0482; G06F 3/0484; G06F 3/167; G06F 17/30377; G06F 17/30867; G06F 19/326; G06F 19/3456; G06F 21/105; G06F 21/44; G06F 21/57; G06F 21/6218; G06F 2221/0773; G06F 3/012; G06F 3/017; G06F 3/04842; G06K 9/00536; G06K 9/00671; G06K 9/00979; G06K 9/00986; G06K 9/3258; G06K 9/46; G06K 9/4614; G06K 9/6212; G06K 9/6227; G06K 9/6267; G06K 9/6288; G06K 19/07762; H04M 2242/30; H04M 3/42127; H04M 1/72533; H04M 1/72536; H04M 1/72572; H04M 2201/50; H04M 2203/306; H04M 2242/04; H04M 3/567
See application file for complete search history.

(56) References Cited

U.S. PATENT DOCUMENTS

| | | | | |
|---|---|---|---|---|
| 8,452,868 | B2 * | 5/2013 | Shafer | G08B 13/2402 340/568.1 |
| 8,519,848 | B2 * | 8/2013 | Stern | G06K 7/10366 235/385 |
| 9,120,622 | B1 * | 9/2015 | Elazary | B25J 9/1697 |
| 9,280,757 | B2 | 3/2016 | Parpia et al. | |
| 9,466,046 | B1 | 10/2016 | Theobald | |
| 9,740,897 | B1 * | 8/2017 | Salour | G06K 7/10316 |
| 9,908,702 | B2 * | 3/2018 | Elazary | G05D 1/0234 |
| 2004/0182925 | A1 * | 9/2004 | Anderson | B07C 3/20 340/572.1 |
| 2008/0111661 | A1 * | 5/2008 | Lin | G06K 7/0008 340/10.1 |
| 2009/0021343 | A1 * | 1/2009 | Sinha | H04L 63/1441 340/5.2 |
| 2010/0201520 | A1 * | 8/2010 | Stern | G01S 13/75 340/572.1 |
| 2010/0277280 | A1 * | 11/2010 | Burkart | H04Q 9/00 340/10.1 |
| 2011/0080267 | A1 * | 4/2011 | Clare | G01S 13/82 340/10.4 |
| 2013/0049925 | A1 * | 2/2013 | Subramanian | G06K 7/10089 340/3.1 |
| 2014/0160250 | A1 * | 6/2014 | Pomerantz | H04N 23/51 348/222.1 |
| 2014/0351098 | A1 * | 11/2014 | Shafer | G06Q 10/087 705/28 |
| 2015/0262117 | A1 * | 9/2015 | Li | G06Q 10/087 235/385 |
| 2016/0057613 | A1 * | 2/2016 | Hines | H04W 8/22 455/419 |
| 2016/0121487 | A1 * | 5/2016 | Mohan | B25J 13/085 700/250 |
| 2016/0132822 | A1 * | 5/2016 | Swafford | H04W 4/80 705/28 |
| 2016/0304281 | A1 * | 10/2016 | Elazary | B65G 1/0492 |
| 2016/0341811 | A1 * | 11/2016 | Langlois | G01S 5/0284 |
| 2017/0026818 | A1 * | 1/2017 | Beaulieu | G01S 1/024 |
| 2017/0053315 | A1 * | 2/2017 | Walden | G06Q 30/0261 |
| 2017/0131994 | A1 * | 5/2017 | Middleton | G06F 8/65 |

* cited by examiner

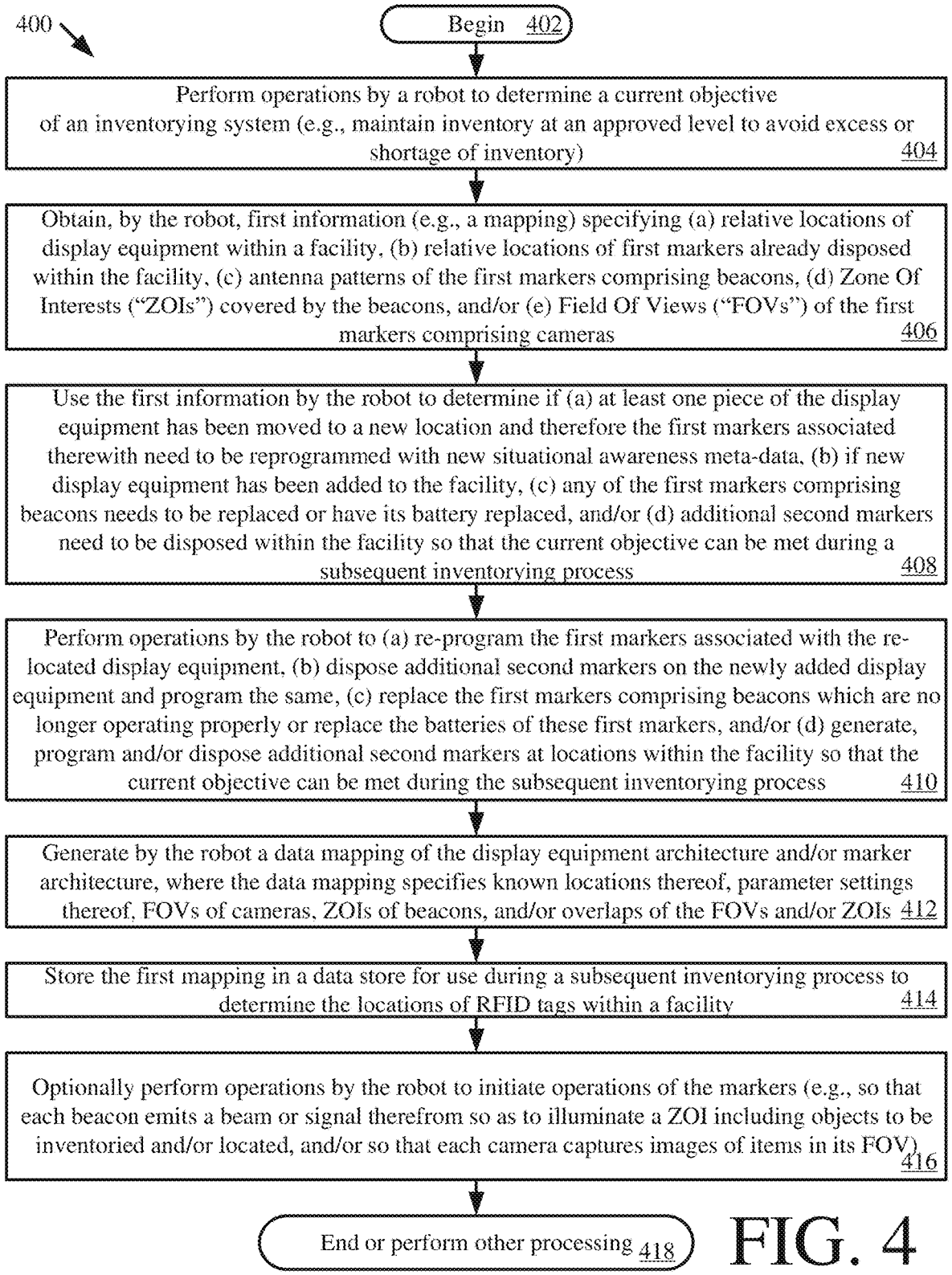

ROBOTIC GENERATION OF A MARKER DATA MAPPING FOR USE IN INVENTORYING PROCESSES

CROSS-REFERENCE TO RELATED APPLICATIONS

This application claims the benefit of U.S. Provisional Patent Application 62/408,578, filed Oct. 14, 2015. The contents of this U.S. Provisional Patent Application are hereby incorporated by reference.

FIELD OF THE INVENTION

This document relates generally to inventory systems. More particularly, this document relates to systems and methods for the robotic generation of a marker data mapping (or location reference data) for use in inventorying processes.

BACKGROUND OF THE INVENTION

Various methods are known for inventorying items in a facility. One method employs various technologies for counting the items in the facility as well as determining the items' locations within the facility. The various technologies include Radio Frequency Identifier ("RFID") technology and Bluetooth technology.

RFID technology has conventionally been used in the identification and tracking of products, equipment, and even people. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows retailers to rapidly and/or continuously identify products, count products and track product locations. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. With this level of inventory visibility, retailers must also take on the additional burden of being able to locate specific products easily and quickly so that they can service the above-listed use cases. Products on the market today to aid in determining a product's location are either too expensive or not accurate enough to serve this need.

Indoor proximity systems are well known in the art. One conventional indoor proximity system is known as iBeacon®. iBeacon® employs Bluetooth communication technology to connect to mobile communication devices (e.g., cellular phones). Upon establishment of such connection, the iBeacon® requests and receives first information from each Mobile Communication Device ("MCD"). The first information includes information which has been agreed upon by the cell user for provision to the iBeacon®. The iBeacon® can also push second information to the MCD. The Bluetooth communication technology is based on a 2.45 GHz transmission, and its data rate ranges from 1 Mbit to 24 Mbit.

In the above described conventional inventorying systems, RFID tags and/or iBeacons® are used for creating markers and location information within the facilities. Often RFID tags, iBeacons® and other types of markers are manually placed on various movable and fixed structures to help equipment automatically identify either information about the equipment and/or its location within the facility. One of the difficulties of such systems is the necessity and cost to create a mapping of all of the markers that can be used to determine the locations of products, equipment, and even people within a facility during an inventorying process. The mapping needs to be updated every time a piece of equipment is moved to a new location within the facility, old equipment is reconfigured or reprogrammed, and/or new equipment is added to the system. The mapping is manually created via costly and error-prone human activities (including human-software interactions).

SUMMARY OF THE INVENTION

The present document concerns systems and methods for creating and/or maintaining a data mapping to be used in a subsequent inventorying process to locate objects within an area. The methods involve: identifying, by a robot, at least one first marker disposed within the area which should be re-programed; transforming, by the robot, a first programmed state of the at least one first marker to a second programmed state; and creating, by the robot, the data mapping specifying a current physical location of the at least one first marker which was re-programed and current physical locations of second markers also disposed within the area. The operations performed by the robot may be autonomous operations. Each of the first and second markers comprises a barcode, a locator tag, a beacon or a camera.

In some scenarios, the robot also detects when a piece of display equipment has been re-located within the area. The first marker is identified by the robot in response to such a detection. The robot may further: identify at least one location in the area at which at least one third marker should be disposed; perform operations to dispose the at least one third marker at the identified location; and modify the data mapping to specify a current physical location of the third marker. The location can be identified in response to: the robot's detection of a piece of display equipment which has recently been added to the area; and/or the robot's determination that an additional marker should be disposed within the area in order for a current objective of an inventorying system to be met during the subsequent inventorying process.

In those or other scenarios, the robot determines a battery status of a marker of the first and second markers. The robot performs actions to autonomously replace the marker or a battery of the marker when the battery status indicates that the marker or battery should be replaced. Additionally or alternatively, the robot performs operations to adjust a beam emitted from a marker of the first and second markers so that a coverage area of the marker matches a camera's FOV. The camera may be disposed on the robot. The beam can be adjusted by modifying the power levels of the marker.

DESCRIPTION OF THE DRAWINGS

Embodiments will be described with reference to the following drawing figures, in which like numerals represent like items throughout the figures.

FIG. 4 provides a flow diagram of an exemplary method for creating a marker mapping.

DETAILED DESCRIPTION OF THE INVENTION

Figure 1:
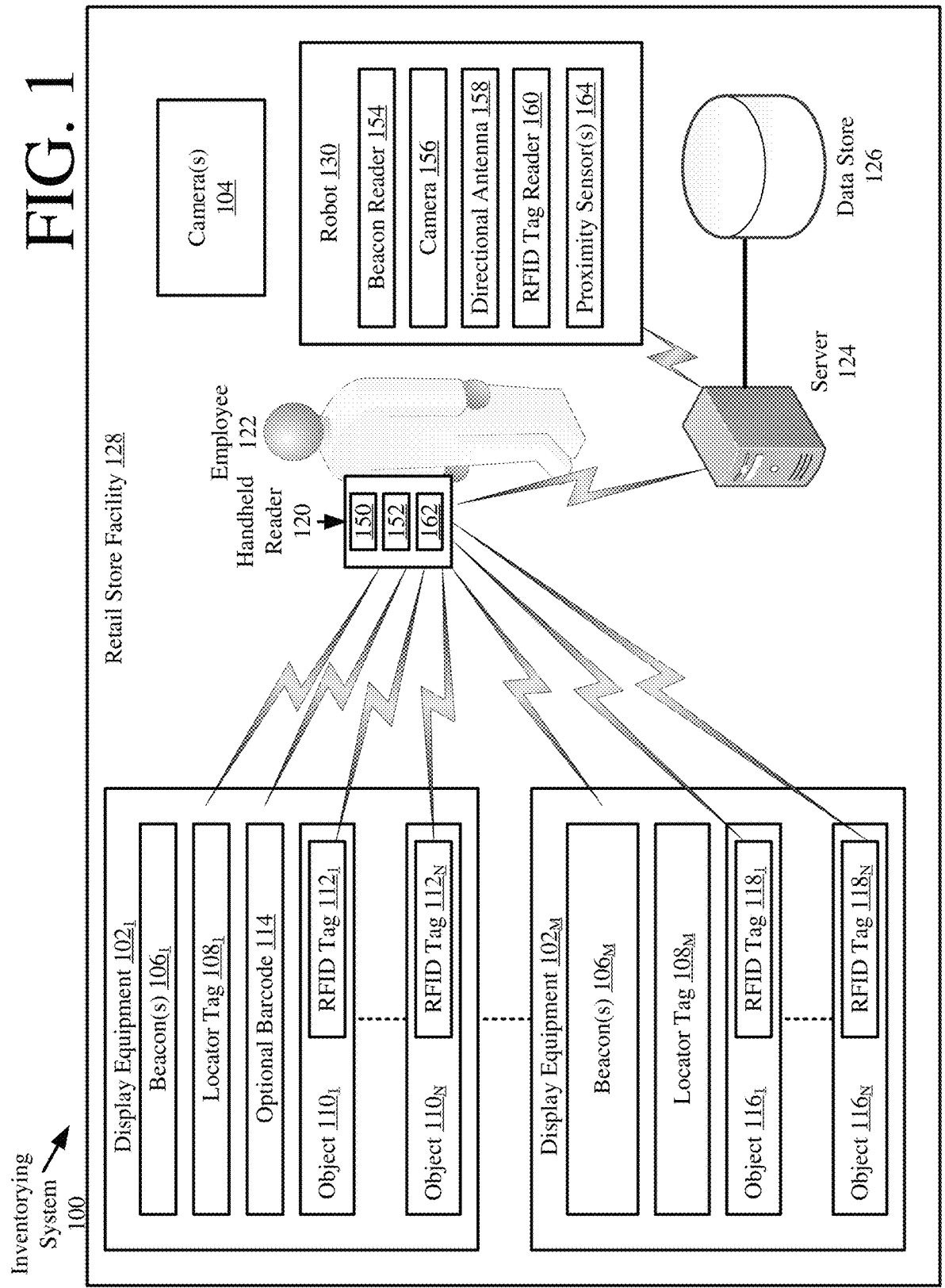
FIG. 1 is an illustration of an exemplary architecture for an inventorying system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns systems and methods for providing an improved inventorying system. The improvement is achieved by use of a robot that generates reference data for use during an inventorying process to determine the location of items within a given area of interest (e.g., a building or an area within or outside of the building). The reference data comprises a map or mapping of the locations of markers distributed throughout the given area of interest. The markers include, but are not limited to, barcodes, locator tags, iBeacons® and/or cameras. The robot generates the map or mapping by: (a) autonomously placing markers of various types within the given area of interest; (b) autonomously configuring or reconfiguring the markers; and (c) storing first information indicating the locations of the markers in the given area of interest. The first information can be stored in any format selected in accordance with a particular application. For example, the first information can be stored in a table format. The first information can be used to generate a multidimensional map showing the respective locations of the markers within the given area of interest.

Prior to describing the present robotic solution, an exemplary inventorying system is described to assist the reader in understanding how the map or mapping can be used as reference data during an inventorying process. Notably, the robot of the present solution can also be used to perform the inventorying process. The cost of this robotic inventorying process is relatively low and can be performed at any time relatively quickly. By adding a highly directional RFID antenna onto the robot, it is possible to locate very accurately where the items are located in the area of interest. The RFID antenna can include, but is not limited to, a Yagi antenna or a beam steered metamaterials antenna. Both of these antennas are well known in the art, and therefore will not be described herein. Any known or to be known Yagi antenna or metamaterials antenna can be used herein without limitation.

Exemplary Inventorying System

Referring now to FIG. 1, there is provided a schematic illustration of an exemplary inventorying system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The inventorying system 100 is generally configured to allow improved object and/or item locating within a facility using various types of communication and sensor technologies. As shown in FIG. 1, inventorying system 100 comprises a Retail Store Facility ("RSF") 128 in which display equipment $102_1, \ldots, 102_M$ is disposed. The display equipment is provided for displaying objects (or items) $110_1\text{-}110_N$, $116_1\text{-}116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

Cameras 104 are located at strategic locations within the RSF 128. The placement of the cameras within the RSF 128 can be autonomously performed by a robot 130 during a pre-inventorying process or by a human during a pre-inventorying process. The robot 130 and the pre-inventorying process will be described in detail below. In some scenarios, the cameras 104 are disposed on walls, ceilings and/or display equipment $102_1, \ldots, 102_M$. The cameras 104 are configured to capture images and/or videos of scenes within their Field Of Views ("FOVs"). The term "Field Of View" or "FOV", as used herein, refers to the extent of the observable world that is captured at any given moment by a camera. Each FOV has a value less than or equal to one hundred eighty degrees (180°). The cameras are provided to assist in identifying items located within the RSF 128 and/or the item locations within the RSF 128. In this regard, the cameras employ algorithms to determine what some of the items are on the display equipment $102_1, \ldots, 102_M$. For example, the cameras are able to identify objects in images captured thereby and determine characteristics of those objects (e.g., color, size, shape, etc.). These characteristics are then compared against a database of object-related data to determine if match or a similarity exits therebetween. If a match or similarity exits, then the object unique identifier associated with the matching or similar stored object-related data is allocated to the image. However, the cameras are unable to show what is under stacks of items and behind other items. Accordingly, the present solution combines the benefits of the cameras and other technologies to improve the accuracy of the inventorying system. This other technology includes, but is not limited to, beacon technology, locator tag technology and/or barcode technology.

In this regard, beacons $106_1, \ldots, 106_M$ are also located at strategic locations within the RSF 128. In some scenarios, the beacons are disposed on display equipment $102_1, \ldots, 102_M$, as shown in FIG. 1. Additionally or alternatively, the beacons are disposed on emergency equipment, checkout counters, walls, ceilings, and/or EAS system equipment (e.g., pedestals near and entrance/exit of the RSF). Beacons are well known in the art, and therefore will not be described herein. Still, it should be understood that the beacons are generally configured to facilitate a periodic or continuous determination of locations of the objects within the RSF 128. The beacons are not communicatively coupled to a network.

The beacons $106_1, \ldots, 106_M$ rely on highly directional signals (such as optical signals) in order to illuminate a well-defined zone (e.g., a shelf). Accordingly, the beacons can include, but are not limited to, infrared beacons, ultrasonic beacons, and RF beacons. The RF beacons can employ an 802.11 protocol, an 802.15.4 protocol or Bluetooth technology.

The beacons $106_1, \ldots, 106_M$ are positioned so that beams are emitted toward locations where items are stored (e.g., shelves). For example, the beacons may be mounted overhead emitting downward to limit operator body shielding and avoid blocking obstacles. In some scenarios, the beacons would not emit vertically but with certain angles. The coverage of a beacon is the field in which the beacon receiver is able to receive and decode the beacon signals. This field is called the "Zone-Of-Interest" or "ZOI". The locations of the ZOIs are known. Each ZOI is identified by the location Identifier ("ID") transmitted from a respective beacon. The beacons can be arranged so that their ZOIs do or do not overlap. Overlapping ZOIs provide a means to compensate shadowing from an operator body or obstacles.

Each ZOI contains the items to be inventoried and located. The size of the ZOI depends on the location accuracy. In some exemplary cases, the ZOI is less than a one (1) meter radius. The RSF 128 has a plurality of ZOIs. A single ZOI could encompass a single shelf, rack or table. The present invention is not limited to the particulars of this example.

In some scenarios, the cameras 104 are positioned and/or configured so that they cover the same or similar ZOI as the beacons $106_1, \ldots, 106_M$. As noted above, each camera has a FOV. The FOV can be modified (i.e., decreased) to only cover a ZOI. Similarly, a beam emitted from a beacon can be adjusted to match or substantially match the camera's FOV. The adjustment of the camera's FOV and/or the beacon's beam is autonomously performed by a robot 130 during a pre-inventorying process and/or an inventorying process. Exemplary pre-inventorying and inventorying processes will be described in detail below.

The cameras can see stacks of products. The cameras can look at color, size and other characteristics to determine that the entire stack of objects is a single Stock Keeping Unit ("SKU") or different sizes of the same SKU. However, since the camera has a limited ability to see the RFID tags coupled to the objects, the inventorying system 100 can rely on RFID tag reads to determine if there are multiple SKUs in the same stack of objects. The RFID tag reads can also be used to determine and/or verify the locations of the objects. By combining data from RFID tag reads and the camera images, the total accuracy of the inventorying process is increased by a significant percentage.

By correlating RFID tag reads and the location ID received from a beacon, it is possible to determine and/or verify the location of objects $110_1, \ldots, 110_N, 116_1, \ldots, 116_N$ within the RSF 128. In this regard, it should be understood that information (e.g., a map or data mapping) is stored in a data store (e.g., data store 126) that specifies the known locations of the beacons in three dimensional ("3D") space. This information can be stored in the data store using the robot 130 and a server 124. Robot 130 and server 124 will be described in more detail below in relation to FIG. 2.

The beacons $106_1, \ldots, 106_M$ are designed to be inexpensive, light, small, autonomous, easy to mount, long lasting and energy efficient. In this regard, the beacons may comprise an energy harvesting circuit. The energy harvesting circuit can include, but is not limited to, a solar cell array, a rechargeable battery, a super capacitor and/or a voltage converter.

At least one beacon reader 150, 154 is provided for communicating with the beacons $106_1, \ldots, 106_M$. In this regard, each beacon reader 150, 154 comprises a receiver designed to receive beacon signals from the beacons when placed with the ZOIs, respectively. A first beacon reader 150 may be provided as an accessory to a handheld reader 120, or alternatively worn by an operator 122 of the handheld reader 120 to optimize reception and to avoid the obstruction of beacon signals by the operator's body. The shoulders, head or arms of the operator are relatively good placements to receive highly directional signals from the beacons $106_1, \ldots, 106_M$. A second beacon reader 154 may be provided with the robot 130.

Each beacon reader 150, 154 may use broad and/or multiple sensors pointing at different directions to maximize reception and compensate the operator's or robot's movement and motion. The beacon reader 150, 154 could use the fusion of inertial sensors (e.g., a gyroscope, an accelerometer and/or a magnetometer) to identify the spatial position of the beacon receiver, and therefore the direction of the inertial sensor. In some scenarios, only location IDs received from the sensor pointing up is used. In this case, the inertial sensors are used to determine which sensor is pointing up and therefore which sensor to listen.

Notably, locator tags $108_1, \ldots, 108_M$ may be employed in addition to or as an alternative to the beacons $106_1, \ldots, 106_M$. Each locator tag has a unique ID associated therewith. When the handheld reader 120 and/or robot 130 reads a locator tag, it obtains the unique ID. Information is stored in database 126 which specifies the known locations of the locator tags. Accordingly, RFID tags $112_1, \ldots, 112_N$ read in time proximity with a locator tag can be assigned to the approximate same location (e.g., a particular shelf, table or other piece of display equipment).

As noted above, the handheld reader 120 and/or robot 130 is(are) generally configured to read RFID tags $112_1, \ldots, 112_N, 118_1, \ldots, 118_N$ and the locator tags $108_1, \ldots, 108_M$. The RFID tags $112_1$-$112_N$, $118_1$-$118_N$ are respectively coupled to the objects $110_1$-$110_N$, $116_1$-$116_N$. The RFID and locator tags are described herein as comprising single-technology tags that are only RFID enabled. The present invention is not limited in this regard. The RFID and locator tags can alternatively or additionally comprise dual-technology tags that have both EAS and RFID capabilities.

In some scenarios, the handheld reader 120 and/or robot 130 operate(s) in a static configuration. The power and other RFID parameters are set before reading tags to inventorying the same. The whole inventory of tags is performed with the configuration set at the start of the inventorying process.

In other scenarios, the handheld reader 120 and/or robot 130 operate(s) in a dynamic configuration. The handheld reader 120 and/or robot 130 dynamically adapt(s) the RFID parameters based on whether or not it is present within a ZOI. When the handheld reader 120 or robot 130 is not present within a ZOI, it operates in a default mode, i.e., using a maximum power and reading RFID tags only once to ensure inventory accuracy in a timely manner. When the handheld reader 120 or robot 130 is within a ZOI, it operates in a location mode, i.e., it toggles between reads at high power and reads at low power. The power used to read an RFID tag is inversely proportional to a tag location confidence factor. That is, the lower the power used to read an RFID tag, the higher the tag location confidence. High power reads ensure inventory accuracy, while low power reads allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

During operation of inventorying system 100, RFID tag location is performed by allocating a ZOI to each RFID tag. The ZOI is identified by the location ID received from a beacon when the RFID tags' are being read by the handheld reader 120. As the beacon position is known and associated with a unique location ID, the physical location of the RFID tag is deduced and located as being within the ZOI of the beacon.

Notably, the location ID is not constantly received while the beacon receiver is in the ZOI. Accordingly, the mode of the handheld reader or robot is maintained for a certain period of time ("latch time") and renewed each time a location ID is received. The latch time does not exceed a few seconds as the operator or robot can physically move from one ZOI to another ZOI within a few seconds. For each location ID received, a time window is defined in which occurred tag reads are associated with the location.

In some scenarios, two or more ZOIs overlap or RFID tags may be read from an adjacent ZOI, which causes cross-reads to occur. A cross-read is a tag read from a first ZOI to a second ZOI. Cross-reads cause location conflicts and may reduce location accuracy. In order to resolve location conflicts, a location confidence is computed for each location ID and for each tag involved. The location confidence is computed based on the number of reads, an average Received Signal Strength Indicator ("RSSI"), a max RSSI and the power level of the RFID tag reader 152, 160 at the time of a tag read. The tag location is deducted from the location ID having the highest location confidence value. An RFID tag can be declared between multiple locations if there is no clear winner based on the location confidences.

In other scenarios, simple logic is employed to determine tag locations. For example, the handheld reader or robot records a time window centered on a timestamp of each location ID received. Then for each RFID tag, the timestamp of the read having the highest RSSI is used to retrieve the associated location ID if it is included in a recorded time window. The location is deduced from the location ID.

In some scenarios, one or more locator tags $108_1, \ldots, 108_M$ are placed within each beacon's ZOI for improving location accuracy by providing additional location data. The placement of the locator tags can be performed autonomously by the robot 130. In some scenarios, a locator tag is placed on each side of a table or shelf. Alternatively or additionally, a locator tag is placed on each shelf of multi-shelf display equipment. A locator tag can include, but is not limited to, an RFID tag mounted on a wall, ceiling, ground or equipment for which a location is known. The locator tag is oriented to be easily read.

An RFID tag $112_1, \ldots, 112_N$ may be used as a locator tag if its determined location is considered as having a high degree of confidence. In this scenario, the locator tag reads adjust the location confidence for each RFID tag read in close time proximity. Tag reads around the same time as a locator tag have a higher probability to be in the same ZOI as the locator tag. The locator tag reads are also used to provide approximate positions within the ZOI reducing the location granularity. The locator tag reads also help to approximate the height of the surrounding RFID tags enabling 3D mapping.

The tag location in regards to locator tags is performed when both tags have been read at a relatively lower power (short range). Since the usage of low power reduces the inventory accuracy and/or slows down the process, it should be performed only when necessary. The handheld reader 120 or robot 130 will operate in default mode most of the time (i.e., read using a relatively high power), and operate in location mode only when close to objects (i.e., read using a relatively low power). The location mode is triggered when a locator tag is read along a relatively high RSSI. The location mode is maintained for a certain period of time. The time period is renewed when a reader trigger event reoccurs. A low power read on a locator tag is also an event renewing the location mode period.

The location mode can also be triggered by detecting the proximity of items or obstacles. In this case, the handheld reader and/or robot is equipped with a proximity sensor 162, 164 (e.g., an acoustic sensor or infrared sensor). The proximity sensor 162, 164 detects the distance from the handheld reader or robot to the RFID tags being read. A distance threshold value can be applied to trigger the location mode. The distance can be used to adjust the read power of the handheld reader or robot. The distance can be used to compute more precise tag locations.

The tag locations are achieved by considering tag reads in close time proximity with a locator tag read as approximately in the same location. The lower the read power used, the higher the tag location confidence. The location confidence is computed based on the number of reads, an average RSSI, a maximum RSSI and the RFID tag readers's power level used to read the RFID tags. An RFID tag's location is deduced from the locator tag position having clearly the higher location confidence value. An RFID tag can be declared between multiple locations if there is no clear winner based on the location confidences.

Alternatively, a different logic is employed that consists of recoding a time window centered on the timestamp of each locator tag read. All those time windows chronologically aligned create a timeline of the RFID tag reader's location as each time window corresponds to a tag locator for which its location is known.

For each RFID tag, the read having the highest RSSI is selected and the timestamp of this read is used with the timeline. If the timestamp is included in a recorded time window of the timeline, the location is deduced from the location of the corresponding locator tag.

When two time windows overlap, the one created from the read having the highest RSSI takes over the overlapping time period. The applied time window widths can be adjusted based on the RSSI locator tag reads. The higher the RSSI, the wider the time window and vice versa. As a result, a tag locator read having higher RSSI takes priority while a tag locator read occurring at lower RSSI would have their time window reduced or filtered.

The ZOI coverage and locator tag positions have to be known to enable tag location. This mapping can be done by taking physical measurements by the handheld reader 120 or robot 130. Additionally or alternatively, a fingerprint technique is employed. In some scenarios, the handheld reader 120 or robot 130 records received location IDs while pinpointing its position on a map. By doing so, the ZOIs are mapped to physical locations and maintained in a database. The same process can be applied to locator tags. The handheld reader 120 or robot 130 scans a locator tag while pinpointing its location on the map. The scanning can be done by: reading a two dimensional barcode printed on a locator tag; and/or RFID reads at very close range to the locator tag.

The field emitted by a beacon $106_1, \ldots, 106_M$ could be shaped by the handheld reader 120 or robot 130 in order to guarantee that its emitting signals cover the corresponding ZOI. Beacons may contain a control system allowing the beacon reader 150, 154 to remotely change the beacon beam width and range. The beacon reader 150, 154 would provide a feedback to the handheld reader 120 or robot 130 indicating the receiving of location IDs. Using the feedback and the beam width/power remote control, the handheld reader 120 or robot 130 can adjust the beacon to confine the field to the corresponding ZOI. This operation may be performed once during installation or at other times. As the beams are highly directional, the beacon reader 150, 154 would only receive signals from the beacon pointing to its location whatever its position in space.

A more complex implementation could use multiple beacons emitting in multiple directions from various placements (e.g., ceilings, walls, furniture, etc.). The beacon reader 150, 154 receives multiple unique location IDs from multiple beacons at a time. Knowing the coverage of each beacon, a geometric computation is performed to deduce the beacon receiver's position in space. The position can also be retrieved from a database previously populated by a site survey (beacons fingerprint) (which can be performed by robot 130 as described below in relation to FIGS. 2 and 4). The combination of location IDs is the key to access the location entry of the database. Knowing the beacon receiver's position in space, the location mode of the handheld reader 120 or robot 130 could be applied if detected nearby item storage. The item locations are deduced from the position of the handheld reader or robot at the time reads occurred. Additionally, a beacon receiver equipped with directional sensors pointing in various directions can deduce its approximate position in space (roll, pitch and yaw) and location as it would receive specific location IDs from specific sensors at specific positions. A sampling of those position and location combinations can be stored in a database using the fingerprint method and retrieved later.

Handheld readers are well known in the art, and therefore will not be described herein in detail. Any known or to be known handheld reader can be used herein without limitation.

Figure 2:
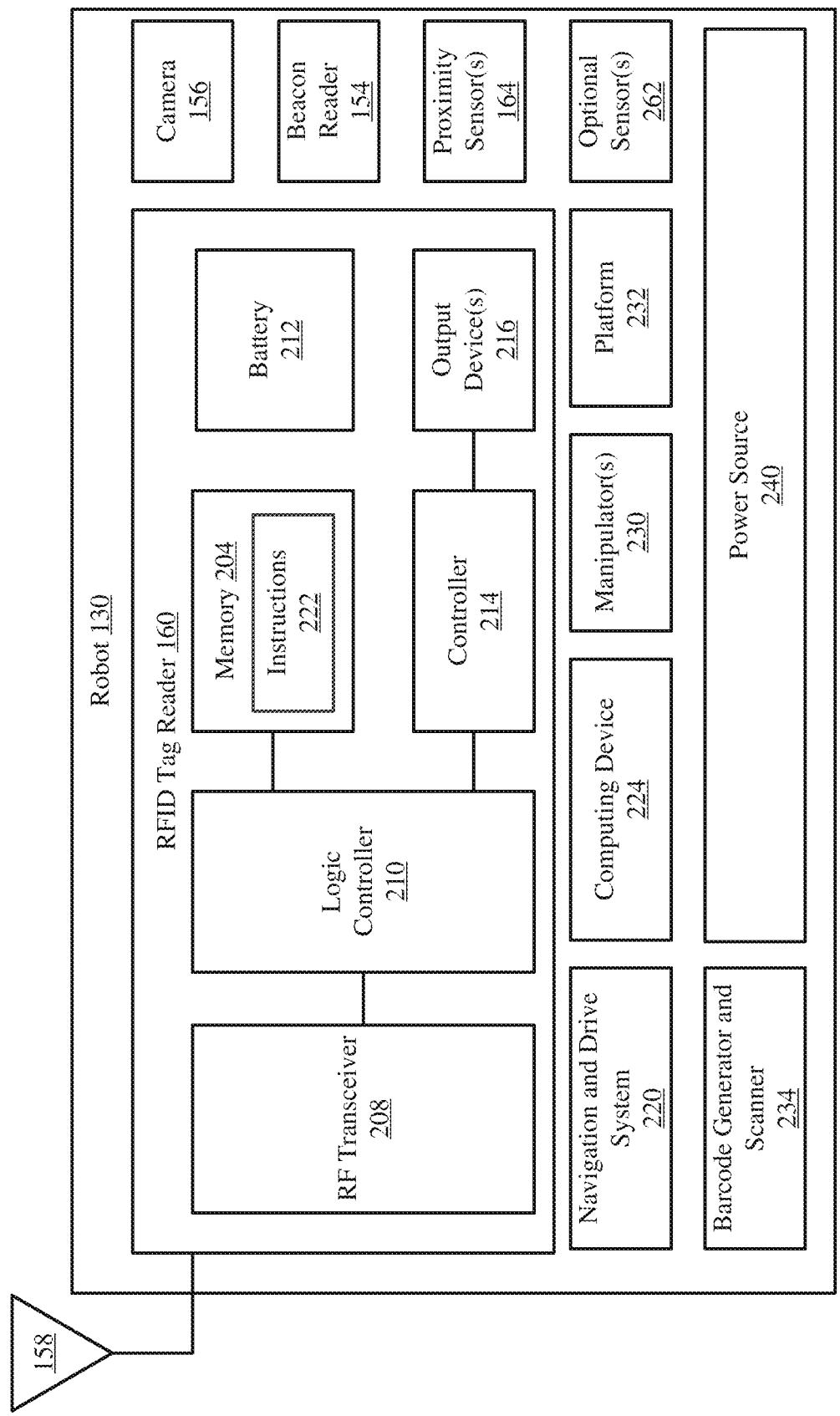
FIG. 2 is an illustration of an exemplary architecture for a robot.

Referring now to FIG. 2, there is provided a detailed block diagram of an exemplary architecture for a robot 130. Robot 130 may include more or less components that that shown in FIG. 2. However, the components shown are sufficient to disclose an illustrative embodiment implementing the present solution. Some or all of the components of the robot 130 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an exemplary architecture of a representative robot 130 configured to facilitate improved object locating within an RSF (e.g., RSF 128 of FIG. 1). In this regard, the robot 130 comprises an RFID tag reader 160 for allowing data to be exchanged with an external device (e.g., locator tags $108_1, \ldots, 108_M$, and/or RFID tags $112_1, \ldots, 112_N, 118_1, \ldots, 118_N$ of FIG. 1) via RF technology. The components 204-216 shown in FIG. 2 may be collectively referred to herein as the RFID tag reader 160, and include a power source 212 (e.g., a battery).

The RFID tag reader 160 comprises an antenna 158 for allowing data to be exchanged with the external device via RF technology (e.g., RFID technology or other RF based technology). The external device may comprise locator tags $108_1, \ldots, 108_M$ and/or RFID tags $112_1, \ldots, 112_N, 118_1, \ldots, 118_N$ of FIG. 1. In this case, the antenna 158 is configured to transmit RF carrier signals (e.g., interrogation signals) to the listed external devices, and/or transmit data response signals (e.g., authentication reply signals) generated by the RFID tag reader 160. In this regard, the RFID tag reader 160 comprises an RF transceiver 208. RF transceivers are well known in the art, and therefore will not be described herein. However, it should be understood that the RF transceiver 208 receives RF signals including information from the transmitting device, and forwards the same to a logic controller 210 for extracting the information therefrom.

The extracted information can be used to determine the location of the robot 130 within a facility (e.g., RSF 128 of FIG. 1). Accordingly, the logic controller 210 can store the extracted information in memory 204, and execute algorithms using the extracted information. For example, the logic controller 210 can: correlate RFID tag reads with beacon reads to determine the location of the RFID tags within the facility; correlated RFID tag reads with locator tag reads to determine the location of the RFID tags within the facility; and/or correlate item information received via RFID tag reads with item information obtained via camera images (e.g., item color, size, shape, etc.) to verify inventorying accuracy.

By combining data from RFID tag reads and the camera images, the total accuracy of the inventorying process is significantly increased. By placing both of the RFID tag reader 160 and a camera 156 on the robot 130, the inventorying process can be performed at a relatively low cost in an automated manner. The robot 130 has knowledge of where it is in 3D space which can be added to the algorithm to increase the accuracy of the inventorying process.

In some scenarios, the robot 130 receives a planogram (e.g., from server 124 of FIG. 1) indicating the placement of objects on display equipment. Planograms are well known in the art, and therefore will not be described in detail herein. Generally, a planogram includes a layout of a venue that provides a diagram or model indicating the placement of objects on shelves. The planogram can have detailed information about products. The detailed information includes, but is not limited to, product characteristics, labels, digital images, and/or videos of the products in the venue.

The robot 130 collects information about the display equipment and the objects located on the display equipment. This information can be collected by reading barcodes, RFID tags and/or beacons associated with the display equipment and/or objects. In some scenarios, the robot 130 compares the size of the display equipment to the size of the object(s) detected as being located thereon. Results of this comparison are used by the robot 130 to (a) determine if the display equipment includes more rows on which undetected (or hidden) objects reside and/or (b) determine how many objects should be disposed on the display equipment. This information can be used to identify a possible inaccuracy in the inventorying process. The robot 130 can then take remedial measures to address the possible inaccuracy. The remedial measures can include, but are not limited to, performing another RFID tag read (a) from a different position relative to the display equipment and/or (b) subsequent to the movement of blocking objects via the robot's manipulator 130 (e.g., an articulating arm). Robotic manipulators are well known in the art, and therefore will not be described herein. Any known or to be known manipulator can be used herein without limitation.

In some scenarios, the RFID tag reader 160 is disposed on a fixed chassis of the robot 130. Alternatively, the RFID tag reader 160 is disposed at the end of an extendable mechanical structure of the robot (not shown in FIG. 2). The extendable mechanical structure can include, but is not limited to, an articulating arm or a plurality of sliding concentric tubular parts. In this case, the robot 130 can move the RFID tag reader 160 into an optimal position (e.g., inside display equipment) for obtaining a more accurate RFID tag read (e.g., by reading hidden RFID tags).

By adding a highly directional antenna 158 to the robot 130, the robot is able to more accurately determine what RFID tags being read correlate to what is shown in the camera images. The highly directional antenna 158 can include a metamaterial antenna with configurable coverage parameters (e.g., beam pattern). The robot can adjust the antenna's coverage parameters so that the ZOI covered by the RFID tag reader 160 is the same as or substantially similar to the FOV of the camera 156. The RFID tag reader's ZOI and the camera's FOV can be dynamically adjusted by the robot 130 at any time.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 222 are stored in memory for execution by the RFID tag reader 160 and that cause the RFID tag reader 160 to perform any one or more of the methodologies of the present disclosure. The instructions 222 are generally operative to facilitate determinations as to where RFID tags are located within a facility. Other functions of the RFID tag reader 160 will become apparent as the discussion progresses.

The robot 130 may also comprise a beacon reader 154. The beacon reader 154 is generally configured to: receive a command signal from the computing device 224 to obtain unique IDs from beacons; send signals to the beacons (e.g., beacons $106_1, \ldots, 106_M$ of FIG. 1) requesting that unique IDs be transmitted therefrom; receiving signals transmitted from the beacons; parsing unique IDs from the received signals; and communicating the unique IDs to the computing device 224.

The beacon reader 154 may also be used to program or re-program the beacons. For example, if the equipment to which the beacons are coupled has been relocated within a facility, then the robot 130 may write data to the beacons that is useful for determining the beacons new locations within the facility. The robot 130 may additionally or alternatively: modify the power levels, coverage areas and/or ZOIs of the beacons; and/or modify the map or mapping of the markers in accordance with the beacons new locations. The coverage areas of the beacons may be adjusted to match FOVs of cameras located in proximity thereto, and vice versa.

The robot 130 may further comprise at least one proximity sensor 164 (e.g., an acoustic sensor or infrared sensor) and/or other sensor 262. The proximity sensor 164 detects the distance from the robot 130 to the RFID tags being read (e.g., RFID tags $112_1, \ldots, 112_N, 118_1, \ldots, 118_N$ of FIG. 1). A distance threshold value can be applied to trigger the location mode. The distance can be used to adjust the read power of the robot 130. The distance can be used to compute more precise tag locations during an inventorying process.

The proximity sensor 164 may also be used during a pre-inventorying process. For example, in some scenarios, the proximity sensor 164 detects the distance from the robot 130 to the markers (e.g., beacons and/or locator tags) being read. A distance threshold value can be applied to trigger the location mode. The distance can be used to adjust the read power of the robot 130. The distance can be used to compute more precise marker locations during a pre-inventorying process. In those or other scenarios, the proximity sensor 164 can be used to detect the robot's 130 distance from markers already placed at strategic locations within the facility. This distance information can be used by the robot to determine where to place new markers in the surrounding area. The more precise marker locations can then be stored in a data store in association with a mapping of the markers. As described herein, the mapping is used in an inventorying process to determine the locations of RFID tags attached to objects.

As shown in FIG. 2, the robot 130 also includes a computing device 224. The computing device 224 is generally configured to control operations of the robot 130. These operations include, but are not limited to, autonomous operations to (a) strategically place markers within the area of interest, (b) program or re-program markers with situational meta-data, (c) generate a map or mapping of the strategically placed markers, and/or (d) determine the locations of objects within the area of interest using the map or mapping. The programming or re-programming can include One Time Programmable ("OTP") settings, identifiers and credentials in a secure manner for security and integrity of the system.

Figure 3:
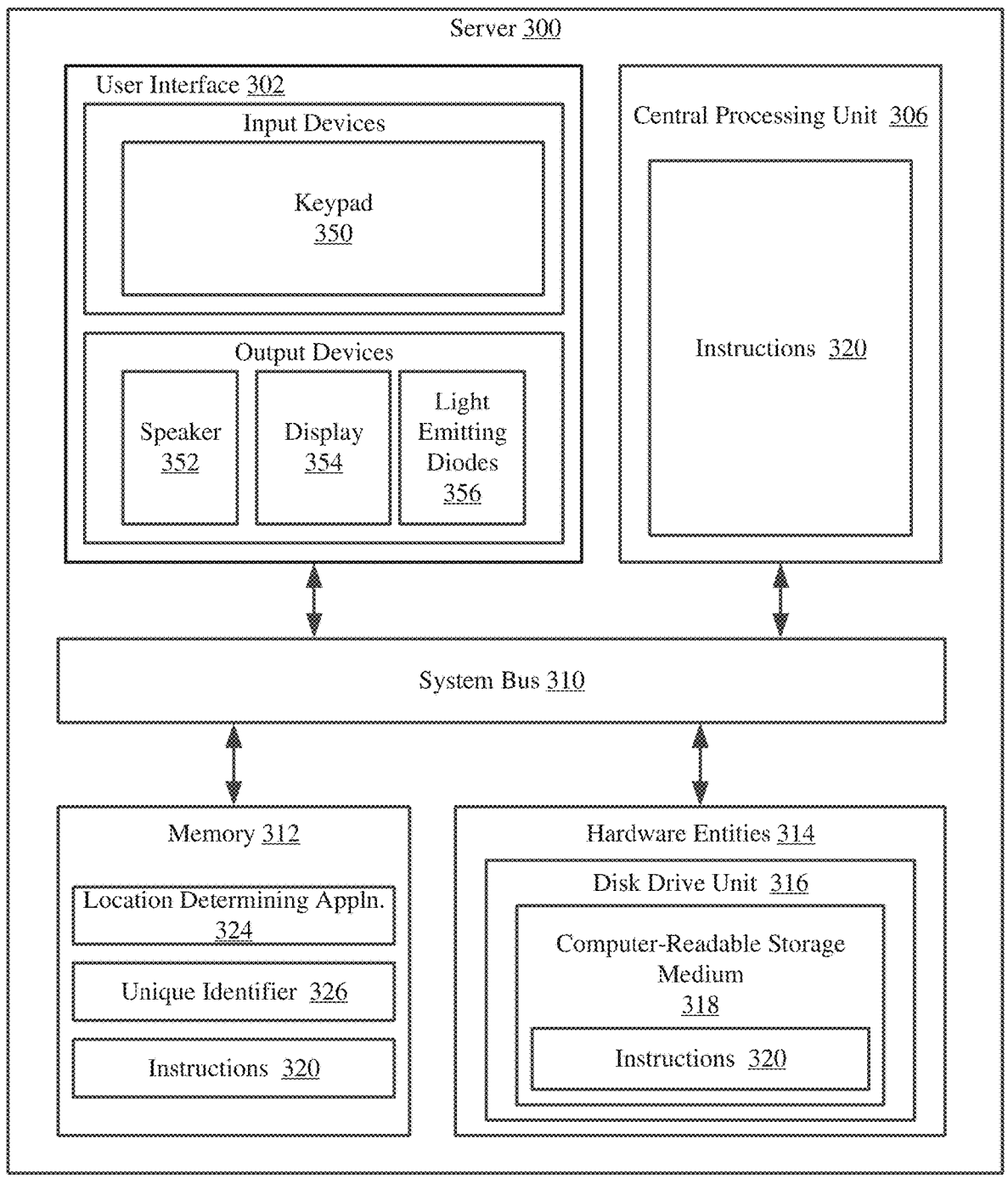
FIG. 3 is an illustration of an exemplary architecture for a server.

The computing device 224 can include a desktop computer, a personal computer or any other device capable of processing and storing data. An exemplary architecture of a server is provided in FIG. 3. Computing device 224 may be the same as or substantially similar to the server shown in FIG. 3. As such, the discussion provided below in relation to FIG. 3 is sufficient for understanding the computing device 224 of the robot 130.

The robot 130 also includes a platform 232. The platform 232 is adapted to hold, contain and/or otherwise support markers and/or other items. In some scenarios, the platform 232 comprises a deck or a bed with a single support surface or multiple support surfaces separated by dividers (e.g., bins, shelves or drawers). The markers and/or other items can be placed on or removed from the platform 232 via the manipulator(s) 230. The manipulator(s) 230 are also used to place the markers and/or other items at strategic locations within an area of interest. In this regard, the manipulator(s) 230 are generally configured to grasp or otherwise hold the markers and/or other items.

In some scenarios, the markers include barcodes. The barcodes may be generated by the barcode generator 234 of the robot 130 during a pre-inventorying process. The generated barcodes are disposed at strategic locations within an area of interest using the manipulator(s) 230. The barcodes can be read by the barcode scanner 234 of the robot 130 and the barcode scanner of the handheld reader 120 of FIG. 1. The barcodes allow the handheld reader 120 of FIG. 1, robot 130 and/or other devices to determine where it(they) is(are) in a facility without having to connect to a backend system.

The robot 130 further includes a navigation and drive system 220. The navigation and drive system 220 is generally configured to move the robot 130 within a surrounding environment without coming in contact with obstructions and without tipping over. In this regard, the drive system 220 includes, but is not limited to, a propulsion system, a drive train, drive wheels, and/or tracks (such as those found on tanks). The navigation system is configured to continuously determine and track the robot's position and location relative to other objects within the facility. Navigation and drive systems are well known in the art, and therefore will not be described in detail herein. Any known or to be known navigation and drive system can be used herein without limitation. In some scenarios, RFID tags are used by the navigation system to track the robot's location within a facility. Additionally or alternatively, the navigation system uses other techniques (e.g., triangulation) to track the robot's location within a facility.

The various components 154-164, 220-262 of the robot 130 are powered by a power source 240. The power source can include, but is not limited to, a rechargeable battery and/or an energy harvesting circuit (e.g., photovoltaic cells and/or a super capacitor).

Notably, the robot 130 is configured to monitor battery statuses of external devices, such as beacons $106_1, \ldots, 106_M$ of FIG. 1. When the robot 130 detects a drained battery, it can recharge the battery, replace the battery and/or replace the external device. As noted above, the beacons are not networked. As such, the robot 130 communicatively connects with the beacons directly for purposes of monitoring the battery statuses thereof. Also, the drained battery may be recharged by direct connection or induction via the robot 130.

In view of the forgoing, the robot 130 is configured to scan for beacons, validate beacon positions, and measure the beacon's battery strength. The robot 130 is also configured to adjust beacon power levels to create just enough coverage area without extending too far. The robot 130 is further able to map out overlaps of beacon coverage areas. The map is useful for determining positions of RFID tags within an area of interest using multiple beacons. The robot 130 is able to detect replaced beacons that were missing and update a mapping with the new beacon information. In general, the robot is configured to automatically validate, correct and maintain marker deployment. Consequently, the robot optimizes ZOIs, system performance and/or adjusts marker parameters in accordance with a given objective (as described below in relation to an exemplary method of FIG. 4).

The robot 130 is not limited to the architecture shown in FIG. 2. The robot may include more or less components as that shown in FIG. 2. For example, the robot 130 can include Light Detection And Ranging ("LIDAR") devices for further facilitating the generation of accurate relative distance and direction information. LIDAR devices are well known in the art, and therefore will not be described herein. Any known or to be known LIDAR device can be used herein without limitation.

Referring now to FIG. 3, there is provided a detailed block diagram of an exemplary architecture for a server 300. Server 124 of FIG. 1 is the same as or substantially similar to server 300. As such, the following discussion of server 300 is sufficient for understanding server 124.

Notably, the server 300 may include more or less components than those shown in FIG. 3. However, the components shown are sufficient to disclose an illustrative embodiment implementing the present solution. The hardware architecture of FIG. 3 represents one embodiment of a representative server configured to facilitate the provision of: a map or mapping of display equipment and/or marker locations within an RSF (e.g., RSF 128 of FIG. 1); and/or a three dimensional map showing locations of RFID tags (e.g., RFID tags $112_1, \ldots, 112_N, 118_1, \ldots, 118_N$ of FIG. 1) within an RSF (e.g., RSF 128 of FIG. 1). As such, the server 300 of FIG. 3 implements at least a portion of a method for providing such data mapping and/or tag locations in accordance with the present solution. Some or all the components of the server 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the server 300 comprises a user interface 302, a Central Processing Unit ("CPU") 306, a system bus 310, a memory 312 connected to and accessible by other portions of server 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the server 300.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the server 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the server 300 and that cause the server 300 to perform any one or more of the methodologies of the present disclosure.

In some scenarios, the hardware entities 314 include an electronic circuit (e.g., a processor) programmed for facilitating the provision of a data mapping and/or a three dimensional map showing locations of RFID tags, display equipment and/or markers within a facility. In this regard, it should be understood that the electronic circuit can access and run a location determining application 324 installed on the server 300. The software application 324 is generally operative to facilitate: the determination of display equipment locations, marker locations and/or RFID tag locations within a facility; and the mapping of the display equipment locations, marker locations and/or RFID tag locations in a virtual three dimensional space. Other functions of the software application 324 will become apparent as the discussion progresses.

Exemplary Methods for Creating a Marker Mapping

A robot (e.g., robot 130 of FIGS. 1-2) with various sensors (e.g., RFID tag reader 160, beacon reader 154, barcode scanner 234, sensors 164, 262, and/or camera 156 of FIG. 2) can be used to automatically and/or autonomously move about an area creating a data mapping and correlation of all the markers, positions, and images of associated physical items. This robot is faster, more accurate and cost effective enough to be regularly deployed whenever a change is made to or is to be made to the layout of the marker infrastructure and/or display equipment infrastructure. The robot can create and maintain a logical structure of markers and a physical data mapping as well. The robot can store close up and long range snapshots of each location to present visual guidance to users trying to find the location while walking.

Robots using LIDAR can also create accurate relative distance and direction information from each marker. One of the advantages of this is that an effective map and navigation system can be created that is based upon relative and relational measurements and not necessarily absolute location (such as Global Positioning System ("GPS")). Other technologies (e.g., compass, inertial reference and distance traveled (measured by wheels) can help build relative positioning mappings and relate these to absolute positions on wall and doors.

Generally, the robot of the present solution is configured to autonomously and/or automatically create and continually update a data mapping (database) of markers and images in large buildings that can be leveraged by applications to determine position, assist in navigation, provide visual verification and provide meta-data about locations. An exemplary method for achieving this is shown in FIG. 4.

Referring now to FIG. 4, there is provided a flow diagram of an exemplary method 400 for creating a data mapping of display equipment locations and/or marker locations using a robot (e.g., robot 130 of FIGS. 1-2). Method 400 can be performed by the robot at pre-selected times, upon the expiration of a time period, periodically, continuously, and/or in response to trigger events. The trigger events can include, but are not limited to: the robot's reception of a command from an external device (e.g., server 124 of FIG. 1); the robot's detection of new equipment in a facility; the robot's knowledge of a new mission objective of an inventorying process; and/or the robot's knowledge of a desired change to a current marker architecture and/or configuration. Notably, the robot has the requisite hardware and/or software for autonomously performing all or a portion of method 400.

Method 400 begins with 402 and continues with 404. In 404, the robot performs operations to determine a current objective of an inventorying system (e.g., inventorying system 100 of FIG. 1). The current objective can be obtained from a data store internal to the robot (e.g., a memory of computing device 224 of FIG. 2) or external to the robot (e.g., data store 126 of FIG. 1). In some scenarios, the objective is to maintain inventory at an approved level to avoid excess or shortage of inventory.

Next in 406, the robot performs operations to obtain first information. This first information may include, but is not limited to, a data mapping (e.g., cross related tables populated with select data). The first information can be obtained from a data store internal to the robot (e.g., a memory of computing device 224 of FIG. 2) or external to the robot (e.g., data store 126 of FIG. 1). The first information specifies: (a) relative locations of display equipment (e.g., display equipment $102_1, \ldots, 102_M$ of FIG. 1) within a facility (e.g. RSF 128 of FIG. 1); (b) relative locations of first markers (e.g., beacons $106_1, \ldots, 106_M$, locator tags $108_1, \ldots, 108_M$, barcode 114, and/or camera(s) 104 of FIG. 1) already disposed within the facility; (c) antenna patterns of the first markers comprising the beacons; (d) ZOIs covered by the beacons; and/or (e) FOVs of the first markers comprising cameras.

The first information may be used by the robot in 408 to make one or more determinations. For example, the robot determines if: (a) at least one piece of the display equipment (e.g., display equipment $102_1$ of FIG. 1) has been moved to a new location and therefore the first markers associated therewith (e.g., beacon $106_1$, locator tag $108_1$ and/or barcode 114 of FIG. 1) need to be reprogrammed with new location meta-data; (b) new display equipment has been added to the facility; (c) any of the first markers comprising beacons needs to be replaced or have its battery replaced; and/or (d) additional second markers need to be disposed within the facility so that the current objective can be met during a subsequent inventorying process.

The robot can make the determinations of 408 by: navigating through the facility; using sensors (e.g., sensors 164 and/or 262 of FIG. 2) to detect display equipment as the robot travels through the facility; using readers/scanners/sensors (e.g., RFID tag reader 160, beacon reader 154, barcode scanner 234, and/or sensors 164, 262 of FIG. 2) to obtain information specifying unique identifiers, types, sizes, shapes and/or locations of display equipment and/or markers disposed within the facility; and/or communicating with the beacons and/or cameras to obtain battery status or other operational status information therefrom. The results of these operations are then compared to the first information to identify differences therebetween. For example, the comparison operations are performed to determine: differences in display equipment location(s) specified by the first information and that detected by the robot as it navigated through the facility; differences in the total number of display equipment pieces identified by the first information and that detected by the robot as it navigated through the facility; differences in the number of markers specified by the first information and the number of markers detected by the robot as it navigated through the facility; and/or whether the first information specifies a marker, FOV and/or ZOI arrangement that is optimized for the current objective determined in 404 and/or for the detected display equipment architecture.

In 410, the robot may perform operations to re-program the first markers associated with the re-located display equipment. If the first marker is a beacon, then the beacon is re-programed to include new situational meta-data (e.g., a ZOI identifier, a display equipment identifier, and/or a shelf identifier) and/or new parameter settings (e.g., a power level setting). The parameter settings can be selected so that the beacon has a desired antenna pattern and/or coverage area (e.g., a footprint of ZOI covered by the beacon is the same as or substantially similar to a footprint of a FOV of a camera in proximity thereto). If the first marker is a locator tag, then the locator tag is re-programed with new situational meta-data (e.g., a ZOI identifier, a display equipment identifier, a shelf identifier, and/or a shelf segment identifier). If the marker is a barcode, then the barcode is replaced with a new barcode (e.g., a pre-generated barcode or a barcode newly generated by the robot).

The robot may also perform operations to dispose additional second markers on the newly added display equipment and program the same. The second markers are selected by the robot based on certain pre-defined criteria. The criteria include, but are not limited to, display equipment types, display equipment characteristics, a display equipment's location relative to that of other display equipment, marker types, marker characteristics, the type of inventory to be stored on the display equipment, the amount of inventory to be stored on the display equipment, desired marker arrangements (e.g., three beacons should always be placed in certain relative locations so that they are no more than ten feet from each other in a triangular configuration and provide a particular overlapping antenna pattern), and/or pre-defined marker arrangements for given applications (e.g., display equipment of a particular shelving type should have a locator tag on both ends of each shelf as well as in the middle of each shelf). For example, if newly added display equipment includes shelves, then beacons, locator tags and/or barcodes are selected to be disposed at one or more locations on each shelf. Additionally, a camera may be disposed on the ceiling above the display equipment, a wall in proximity to the display equipment or display equipment in proximity to the display equipment at issue. The camera operational parameters may be set so that a footprint of the camera's FOV matches a footprint of a beacon's coverage area.

The robot can further replace: the first markers comprising beacons which are no longer operating properly or replace the batteries of these first markers; and/or generate, program and/or dispose additional second markers at locations within the facility so that the current objective can be met during the subsequent inventorying process. The second markers include, but are not limited to, beacons and locator tags. The beacons are strategically placed around the facility. The beacons can be disposed on ceilings, walls, display equipment (e.g., display equipment $102_1, \ldots, 102_M$ of FIG. 1), emergency equipment, checkout counters and/or EAS system equipment. Each beacon has a known directional emission pattern. The beacons can be arranged such that their antenna patterns do or do not overlap. Additionally or alternatively, the operational parameters of the beacons can be modified so that there beam patterns are adjusted in a desired manner. The locator tags are also strategically placed around the facility. The locator tags can be disposed on display equipment, such as shelving units.

In some scenarios, the markers are not networked via wires and are standalone mobile devices. As such, the robot can quite easily and quickly dispose the same within the facility in an autonomous manner (i.e., without the assistance and/or direction of a human).

Once the robot completes the operations of 412, it generates a data mapping of the display equipment architecture and/or marker architecture. The mapping specifies known locations of the display equipment, known locations of markers, parameter settings of the markers, FOVs of cameras, ZOIs of beacons, and/or overlaps of FOVs and/or ZOIs. The data mapping is stored in a data store as shown by 414. The data mapping may be used during a subsequent inventorying process (such as that discussed below in relation to FIGS. 5A-5B) to facilitate determination of RFID tag locations. The data store may be internal or external to the robot.

In some scenarios, the markers may need to be turned on or enabled. Accordingly, the robot may optionally initiate marker operations in 416. For example, the robot may initiate marker operations so that: each beacon emits a beam or signal therefrom so as to illuminate a ZOI including objects to be inventoried and/or located; and/or each camera captures images of items in its FOV or a given ZOI continuously, periodically or in response to a command. For example, a beam is emitted from a beacon to illuminate a particular shelving unit or other piece of display equipment (e.g., a table). Upon completing 414 or 416, 418 is performed where method 400 ends or other processing is performed.

In view of the forgoing, the robot is configured to automatically and autonomously create and continually update a data mapping of display equipment, markers and images in buildings that can be leveraged by applications to determine position, assist in navigation, provide visual verification and provide meta-data about locations. Accordingly, the robot is able to: place generic barcodes, beacons, RF locator tags around an area; map the whole area after the fact; programs beacons and RF locator tags; confirm locations and functioning of markers; and create images at all locations for visual verification and position of users.

Exemplary Methods For Locating RF Enabled-Devices in a Facility Using a Robot

Figure 5A:
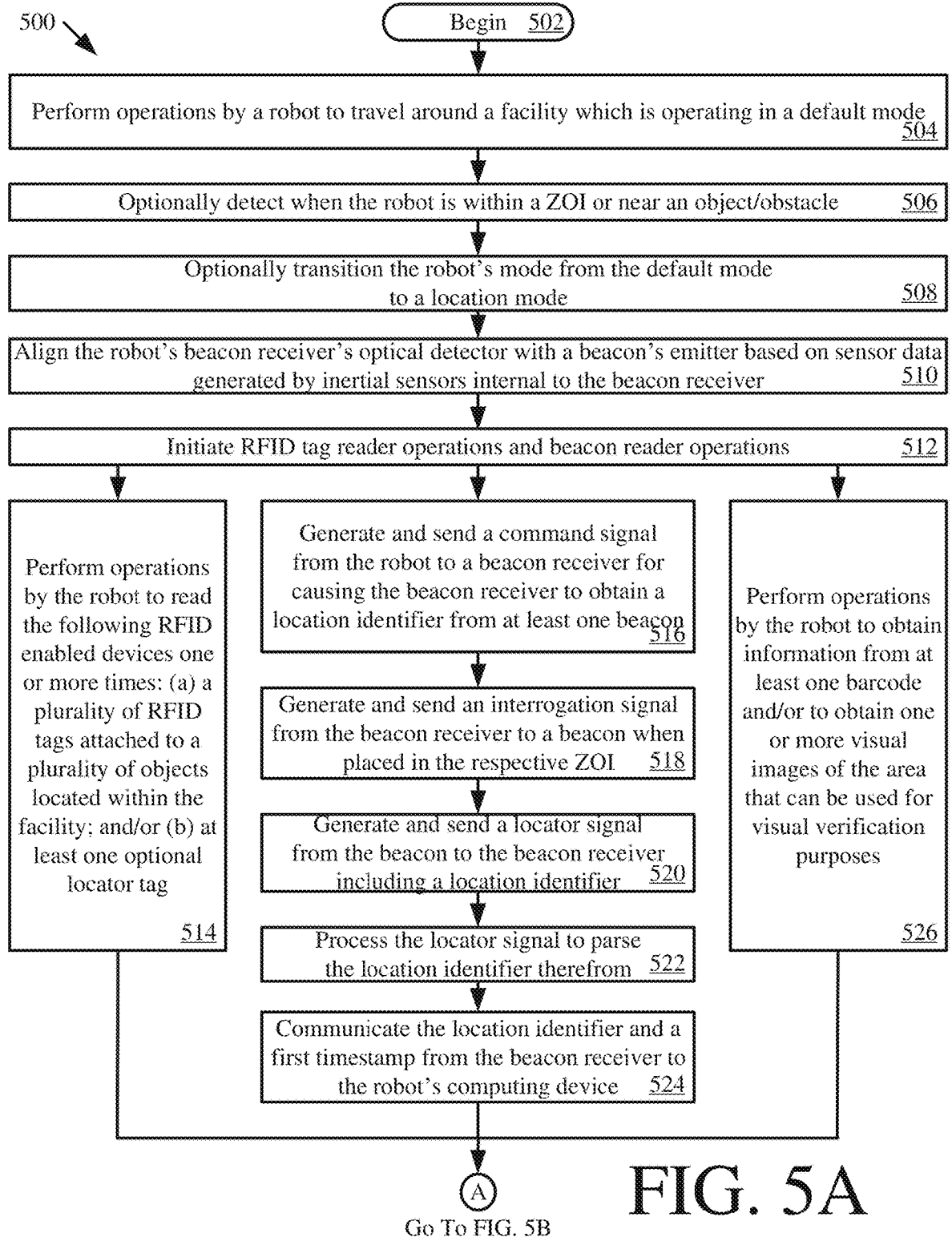
FIG. 5A-5B (collectively referred to as "FIG. 5") provide a flow diagram of an exemplary method for determining locations of RFID tags in an area of interest.
Figure 5B:
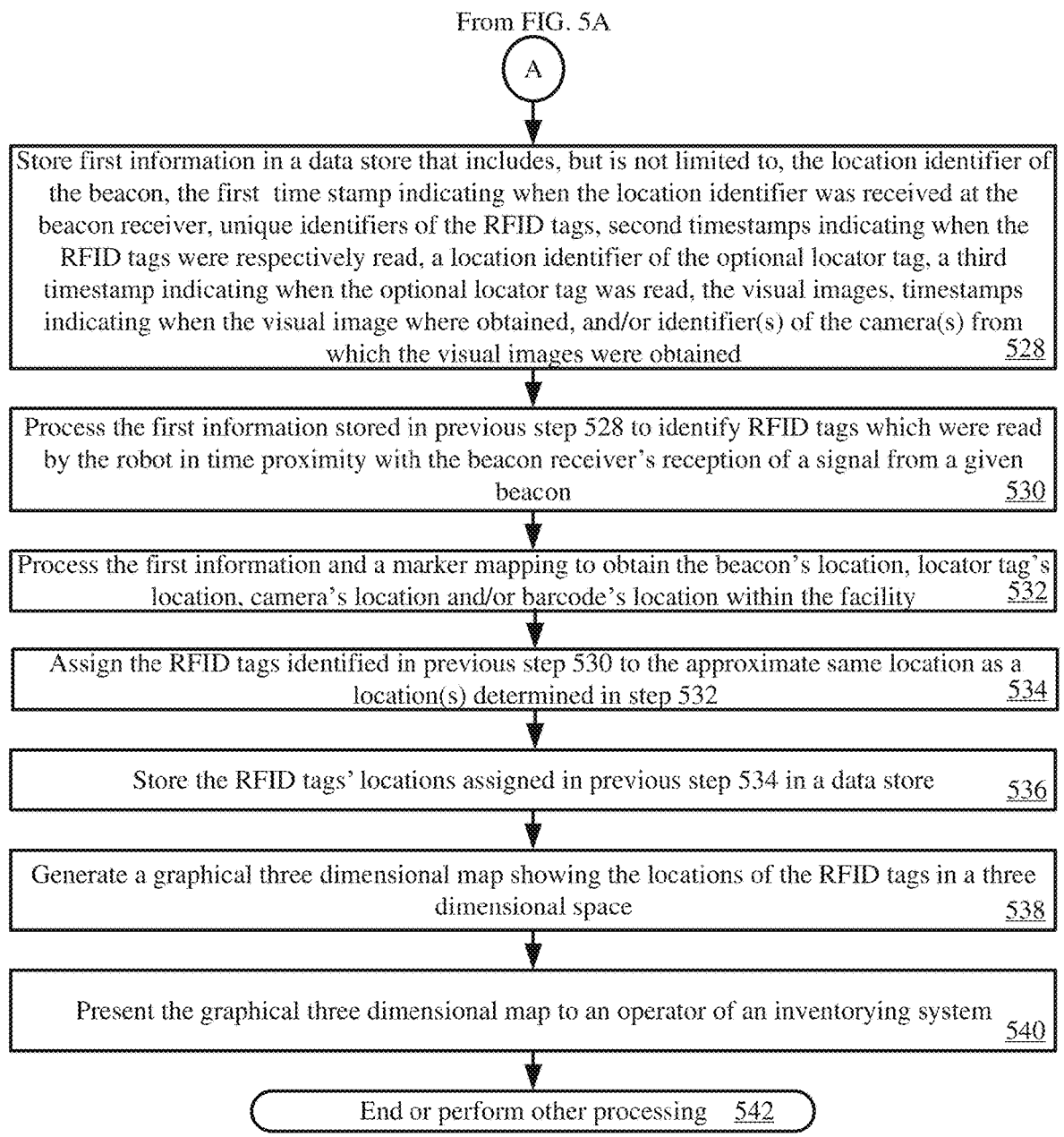

Referring now to FIGS. 5A-5B, there is provided a flow diagram of an exemplary method 500 for determining locations of RFID tags in a given area. Method 500 begins with 502 and continues with 504 where a robot (e.g., robot 130 of FIGS. 1-2) performs operations to travel around a facility (e.g., RSF 128 of FIG. 1). At this time, the robot is operating in a default mode, i.e., using a maximum power and reading RFID tags (e.g., RFID tags $112_1, \ldots, 112_N, 118_1, \ldots, 118_N$ of FIG. 1) only once to ensure inventory accuracy in a timely manner.

In some scenarios, the mode of the robot is automatically changed when a detection is made that the robot is in a beacon's ZOI or near and object/obstacle, as shown by optional 506 and 508. For example, the robot is transitioned from its default mode to its location mode when a detection is made that the robot is in a beacon's ZOI. In the location mode, the robot toggles between reads at high power and reads at low power to allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

A beacon receiver (e.g., beacon reader 154 of FIGS. 1-2) may be provided with the robot. The beacon receiver is provided for communicating with the beacons disposed around the facility while the robot is reading RFID tags. As such, 510 is performed where the beacon receiver's optical detector is aligned with a beacon's emitter based on sensor data generated by inertial sensors (e.g., inertial sensors 262 of FIG. 1) located internal to the robot.

After completing 510, 512 is performed where the robot's RFID tag reader operations and beacon reader operations are initiated. In response to this initiation, method 500 continues with 514, 516-524 and 526, which are performed concurrently. 514 involves performing operations by the robot to read the following RFID enabled devices one or more times: (a) a plurality of RFID tags attached to a plurality of objects (e.g., objects $110_1, \ldots, 110_N, 116_1, \ldots, 116_N$ of FIG. 1) located within the facility; and/or (b) at least one optional locator tag. 526 involves performing operations by the robot to obtain: information from at least one barcode; and/or at least one visual image of the area that can be used for visual verification purposes. The barcodes can be read using a barcode scanner (e.g., barcode scanner 234 of FIG. 2) of the robot. The visual image can be obtained using the robot's camera (e.g., camera 156 of FIGS. 1-2) or external cameras (e.g., cameras 104 of FIG. 1).

While 514 and 526 are being performed, 516-524 are performed. These blocks involve: generating and sending a command signal from a computing device (e.g., computing device 224 of FIG. 2) of the robot to a beacon receiver (e.g., beacon reader 154 of FIGS. 1-1) for causing the beacon signal to obtain a location identifier from at least one beacon (e.g., beacons $106_1, \ldots, 106_M$ of FIG. 1); generating and sending an interrogation signal from the beacon receiver to a beacon when placed in the respective ZOI; generating and sending a locator signal from the beacon to the beacon receiver including a location identifier; processing the locator signal to parse the location identifier therefrom; and communicating the location identifier and a first timestamp from the beacon receiver to the computing device of the robot.

Upon completing 514, 524 and 526, the method 500 continues with 528 of FIG. 5B. In 528, first information is stored in the data store. The first information includes the location identifier of the beacon, a first time stamp indicating when the location identifier was received at the beacon receiver, unique identifiers of the RFID tags, second timestamps indicating when the RFID tags were respectively read, a location identifier of the optional locator tag, a third timestamp indicating when the optional locator tag was read, information obtained from scanning at least one barcode, a fourth timestamp indicating when the barcode(s) was(were) scanned, the visual image(s), a fifth timestamp indicating when the visual images where captured or obtained, and/or identifiers associated with the camera(s) from which the visual images were obtained.

The first information is then processed in 530 to identify RFID tags which were read by the robot in time proximity with the beacon receiver's reception of a signal from a given beacon. The first information is also processed by the robot in 532 to obtain the beacon's location, the locator tag's location, the camera's location and/or a barcode's location within the facility. This is achieved using a marker mapping previously generated by the robot. The marker mapping specifies the locations of the markers disposed throughout the facility. The markers include, but are not limited to, the beacons, the locator tags, the cameras and/or barcodes. The marker location can be obtained from the mapping using unique identifiers for the respective markers. The unique identifiers are stored in a datastore (e.g., data store 126 of FIG. 1 and/or a memory of the computing device 224 of FIG. 2) so as to be associated with respective location information.

The RFID tags (identified in previous 530) are assigned to the approximate same location as the marker location(s) (e.g., a particular shelf of a shelving unit) obtained in previous 532, as shown by 534. If two or more different marker locations are obtained in 532, then the robot performs operations to address this issue. Such operations can involve: selecting one of the different marker locations based on pre-defined criteria; and/or determining a location that resides between the two different marker locations.

The RFID tags' locations are then stored in the data store, as shown by 536. A graphical three dimensional map is generated in 538 which shows the locations of the RFID tags in a three dimensional space. The location of the robot and/or markers may also be shown in the three dimensional map. The graphical three dimensional map is then presented to an operator (e.g., employee 122 of FIG. 1) of an inventorying system (e.g., inventorying system 100 of FIG. 1), as shown by 540. The graphical three dimensional map can be presented on a display of a handheld reader (e.g., handheld reader 120 of FIG. 1) and/or other computing device (e.g., server 124 of FIG. 1). Subsequently, 542 is performed where method 500 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for inventorying objects in a zone of interest (ZOI), comprising:
identifying, by a robot, a first beacon to be adjusted, the first beacon at a first location;
autonomously adjusting, by the robot, the identified first beacon from a first programmed state not conforming to a ZOI to a second programmed state conforming with the ZOI, the adjusted beacon programmed for use in collection of information about objects in a same ZOI as a second beacon at a second location, and the adjusting further comprises adjusting a beam emitted from the first beacon so that a coverage area of the first beacon matches a field of view (FOV) of at least one camera with the at least one camera being at a location that is different and remote from the first location;
autonomously creating, by the robot, a data mapping specifying the first location of the adjusted first beacon and the second location of the second beacon; and
autonomously performing the following inventorying operations by the robot:
detecting when the robot enters the ZOI using the data mapping; and
determining at least a number of the objects in the ZOI.

2. The method according to claim 1, further comprising detecting, by the robot, when a piece of display equipment has been re-located within an area, wherein the identifying is in response to the detecting.

3. The method according to claim 1, further comprising:
second identifying, by the robot, at least one location covering the ZOI at which a third beacon is to be disposed;
performing operations by the robot to dispose the third beacon at the identified location; and
modifying the data mapping to specify a current disposed location of the third beacon.

4. The method according to claim 3, further comprising second detecting, by the robot, a piece of display equipment which has recently been added to the ZOI, wherein the identifying is in response to the second detecting.

5. The method according to claim 3, further comprising second determining, by the robot, that an additional beacon is to be disposed within the ZOI in order for a current objective of an inventorying system to be met during an inventorying process, where the second identifying is in response to the second determining.

6. The method according to claim 1, further comprising:
third determining, by the robot, a battery status of one of the first beacon and the second beacon; and
autonomously replacing, by the robot, the beacon or a battery of the third determined beacon.

7. The method according to claim 1, wherein the inventorying operations further comprise using information obtained from images captured by at least one camera and information obtained from reading at least one Radio Frequency Identifier ("RFD") tag.

8. The method according to claim 1, further comprising performing operations by the robot to adjust power levels of the first and second beacons.

9. The method according to claim 1, further comprising moving the robot into the ZOI using a navigation and driver system of the robot.

10. The method according to claim 1, wherein determining at least a number of the objects in the ZOI is based at least on the robot reading radio frequency identification (RFID) tags coupled to objects within the ZOI.

11. A robot, comprising:
a processor; and
a computer-readable storage medium comprising programming instructions that are configured to cause the processor to implement a method for inventorying objects in a zone of interest (ZOI), wherein the programming instructions comprise instructions to:
identify a first beacon to be adjusted of a plurality of beacons, the first beacon at a first location;
adjust the identified first beacon from a first programmed state not conforming to the ZOI to a second programmed state conforming with the ZOI, the adjusted beacon programmed for use in collection of information about objects in a same ZOI as a second beacon at a second location, and the adjusting further comprises adjusting a beam emitted from the first beacon so that a coverage area of the first beacon matches a field of view (FOV) of at least one camera with the at least one camera being at a location that is different and remote from the first location;
create a data mapping specifying the first location of the adjusted first beacon and the second location of the second beacon; and
autonomously perform the following inventorying operations by the robot:
detecting when the robot enters the ZOI using the data mapping; and
determining at least a number of the objects in the ZOI.

12. The robot according to claim 11, wherein the programming instructions further comprise instructions to detect when a piece of display equipment has been re-located within an area, and wherein the identifying is in response to the detecting.

13. The robot according to claim 11, wherein the programming instructions further comprise instructions to:
second identify at least one location covering the ZOI at which a third beacon is to be disposed;
cause the robot to perform actions to dispose the third beacon at the identified location; and
modify the data mapping to specify a current disposed location of the third beacon.

14. The robot according to claim 13, wherein the programming instructions further comprise instructions to second detect a piece of display equipment which has recently been added to the ZOI, and wherein the identifying is in response to the second detecting.

15. The robot according to claim 13, wherein the programming instructions further comprise instructions to second determine that an additional beacon is to be disposed within the ZOI in order for a current objective of an inventorying system to be met during an inventorying process, where second identifying is in response to the second determining.

16. The robot according to claim 11, wherein the programming instructions further comprise instructions to:
third determine a battery status of one of the first beacon and the second beacon; and
cause the robot to perform actions to replace the beacon or a battery of the third determined beacon.

17. The robot according to claim 11, wherein the inventorying operations further comprise using information obtained from images captured by at least one camera and information obtained from reading at least one Radio Frequency Identifier ("RFID") tag.

18. The robot according to claim 11, wherein the programming instructions further comprise instructions to cause the robot to adjust power levels of the first and second beacons.

19. The robot according to claim 11, wherein the programming instructions further comprise instructions to move the robot into the ZOI using a navigation and driver system of the robot.

* * * * *